US012221258B2

(12) United States Patent
Leary et al.

(10) Patent No.: US 12,221,258 B2
(45) **Date of Patent: *Feb. 11, 2025**

(54) SECURE BEVERAGE CONTAINER WITH LOCKING FEATURE AND RELATED METHODS

(71) Applicant: Secure Cup Enterprises, LLC, Chuluota, FL (US)

(72) Inventors: Rhett C. Leary, Chuluota, FL (US); Brett C. Leary, Horseshoe Beach, FL (US)

(73) Assignee: SECURE CUP ENTERPRISES, LLC, Chuluota, FL (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/664,264

(22) Filed: May 20, 2022

(65) Prior Publication Data

US 2022/0274750 A1 Sep. 1, 2022

Related U.S. Application Data

(63) Continuation of application No. 17/304,870, filed on Jun. 28, 2021, now Pat. No. 11,345,528, which is a (Continued)

(51) Int. Cl.
*B65D 55/14* (2006.01)
*A47G 19/22* (2006.01)
(Continued)

(52) U.S. Cl.
CPC ......... *B65D 55/14* (2013.01); *A47G 19/2227* (2013.01); *A47G 19/2272* (2013.01);
(Continued)

(58) Field of Classification Search
CPC ............... B65D 55/14; B65D 2213/00; B65D 2555/02; B65D 50/00; B65D 81/2038; B65D 81/2015; B65D 51/16; B65D 51/1644; B65D 51/1633; A47G 2400/123; A47G 19/2227; A47G 19/2272; A47G 19/22; A47G 2200/103; E05Y 2400/66; E05Y 2400/858; E05Y 2400/612;
(Continued)

(56) References Cited

U.S. PATENT DOCUMENTS 11,077,997 B2 * 8/2021 Leary ................. A47G 19/2272
11,345,528 B2 * 5/2022 Leary ................. A47G 19/2227

* cited by examiner

*Primary Examiner* — Javier A Pagan
(74) *Attorney, Agent, or Firm* — Allen, Dyer, Doppelt + Gilchrist, PA

(57) ABSTRACT

A secure beverage container may include a body having a first end, a second end opposing the first end, a first longitudinal side extending between the first end and the second end, and a second longitudinal side opposing the first longitudinal side and extending between the first end and the second end, the first end being closed, the second end being open. The body may define a cavity to receive a beverage fluid. The secure beverage container may include a lid to be received by the second end to seal the cavity in the body, and a powered locking device. The secure beverage container may include an access control device coupled to the powered locking device and configured to cause the powered locking device to switch between the locked state and the unlocked state based upon a security token.

9 Claims, 6 Drawing Sheets

Related U.S. Application Data continuation of application No. 17/136,223, filed on Dec. 29, 2020, now Pat. No. 11,077,997, which is a continuation of application No. 16/191,593, filed on Nov. 15, 2018, now Pat. No. 10,894,643.

(51) Int. Cl.
*B65D 50/00* (2006.01)
*E05B 41/00* (2006.01)
*E05B 65/00* (2006.01)

(52) U.S. Cl.
CPC .. *A47G 2200/103* (2013.01); *A47G 2400/123* (2013.01); *B65D 50/00* (2013.01); *B65D 2213/00* (2013.01); *B65D 2555/02* (2013.01); *E05B 41/00* (2013.01); *E05B 65/00* (2013.01); *E05Y 2400/612* (2013.01); *E05Y 2400/66* (2013.01); *E05Y 2400/858* (2013.01); *E05Y 2800/426* (2013.01); *E05Y 2999/00* (2024.05)

(58) Field of Classification Search
CPC ......... E05Y 2800/426; E05Y 2900/602; E05B 41/00; E05B 65/00; E05B 47/06
USPC ....... 215/262; 220/714; 70/57, 63, 163, 166, 70/167
See application file for complete search history.

SECURE BEVERAGE CONTAINER WITH LOCKING FEATURE AND RELATED METHODS

RELATED APPLICATIONS

This application is a continuation of U.S. application Ser. No. 17/304,870 filed Jun. 28, 2021, now U.S. Pat. No. 11,345,528, which is a continuation of U.S. application Ser. No. 17/136,223 filed Dec. 29, 2020, now U.S. Pat. No. 11,077,997, which is a continuation of Ser. No. 16/191,593 filed Nov. 15, 2018, now U.S. Pat. No. 10,894,643, which are hereby incorporated herein in their entireties by reference.

TECHNICAL FIELD

The present disclosure relates to the field of beverage accessories, and, more particularly, to a beverage container and related methods.

BACKGROUND

In many social events and gatherings, it is custom to consume food and beverages. Indeed, in American culture, it is quite common to consume alcoholic beverages in a wide range of events, such as happy hours, business events, and social events. Given that some events are highly attended, it is not uncommon for beverages to be dispensed in identical disposable containers, such as the ubiquitous plastic beverage container.

In these scenarios, the security of your beverage container is generally not a concern. This lack of security can create serious consequences for patrons of these events. Beyond the typical cross-contamination issue between patrons inadvertently exchanging beverage containers, there are also risks due to more nefarious actors.

Most prominently, some bad actors may intentionally attempt to adulterate a patron's beverage container to commit a drug-facilitated sexual assault (DFSA), more commonly known as a date rape. Indeed, it is not uncommon for date rape crimes to start with the adulteration of the beverage container with a hallucinogenic or incapacitating substance, such as rohypnol, ketamine, zopiclone, methaqualone, zolpidem (Ambien), sedatives, ethanol, cocaine, barbiturates, opioids, phencyclidine, and scopolamine. Indeed, some statistics suggest that 1 in 5 women in the United States is a victim of date rape.

Given the danger of DFSA from unknown bad actors, there have been some approaches to protecting a patron's beverage container at these large scale events. In one approach, a smart coaster monitors the status of a beverage container placed thereon. In another approach, for example, U.S. Patent Application Publication No. 2017/0160253 discloses a beverage container that can detect when the beverage therein has been contaminated.

SUMMARY

Generally, a secure beverage container may also include a body comprising a first end, a second end opposing the first end, a first longitudinal side extending between the first end and the second end, and a second longitudinal side opposing the first longitudinal side and extending between the first end and the second end. The first end is closed, and the second end is open. The body may define a cavity therein to receive a beverage fluid. The secure beverage container may comprise a lid to be received by the second end to seal the cavity in the body and comprising a sipping opening. The secure beverage container may comprise a powered locking device carried by the lid and comprising a latch mechanism configured to selectively latch to adjacent portions of the body. The powered locking device may be configured to operate in one of a locked state where the lid is secured to the second end of the body, and an unlocked state when the lid can be removed from the second end of the body. The secure beverage container also may include an access control device coupled to the powered locking device and configured to cause the powered locking device to switch between the locked state and the unlocked state based upon a security token.

More specifically, the body may define a recess, and the latch mechanism may be configured to extend into the recess in the locked state, and retract from the recess in the unlocked state. In some embodiments, the body may define the recess on an interior surface of the body.

The access control device may comprise a biometric scanner device carried by the lid, and the security token may comprise a biometric characteristic of a user. The secure beverage container may further comprise a battery power source carried by the lid and being coupled to the powered locking device and the access control device. The secure beverage container may further comprise a visual indicator carried by the lid, coupled to the access control device, and configured to generate a visual indication when the powered locking device is in the unlocked state. The secure beverage container may further comprise a motor coupled to the latch mechanism. For example, the visual indicator may be configured to generate a visual indication for a low battery state. The access control device may comprise a wireless access control device configured to receive the security token wirelessly from a wireless communications device.

Another aspect is directed to a method of making a secure beverage container. The method may include forming a body comprising a first end, a second end opposing the first end, a first longitudinal side extending between the first end and the second end, and a second longitudinal side opposing the first longitudinal side and extending between the first end and the second end. The first end is closed, and the second end is open. The body may define a cavity therein to receive a beverage fluid. The method may further comprise forming a lid to be received by the second end to seal the cavity in the body and comprising a sipping opening. The method may comprise coupling a powered locking device to be carried by the lid and comprising a latch mechanism configured to selectively latch to adjacent portions of the body. The powered locking device may be configured to operate in one of a locked state where the lid is secured to the second end of the body, and an unlocked state when the lid can be removed from the second end of the body. The method may further include coupling an access control device to the powered locking device and configured to cause the powered locking device to switch between the locked state and the unlocked state based upon a security token.

DETAILED DESCRIPTION

Figure 1:
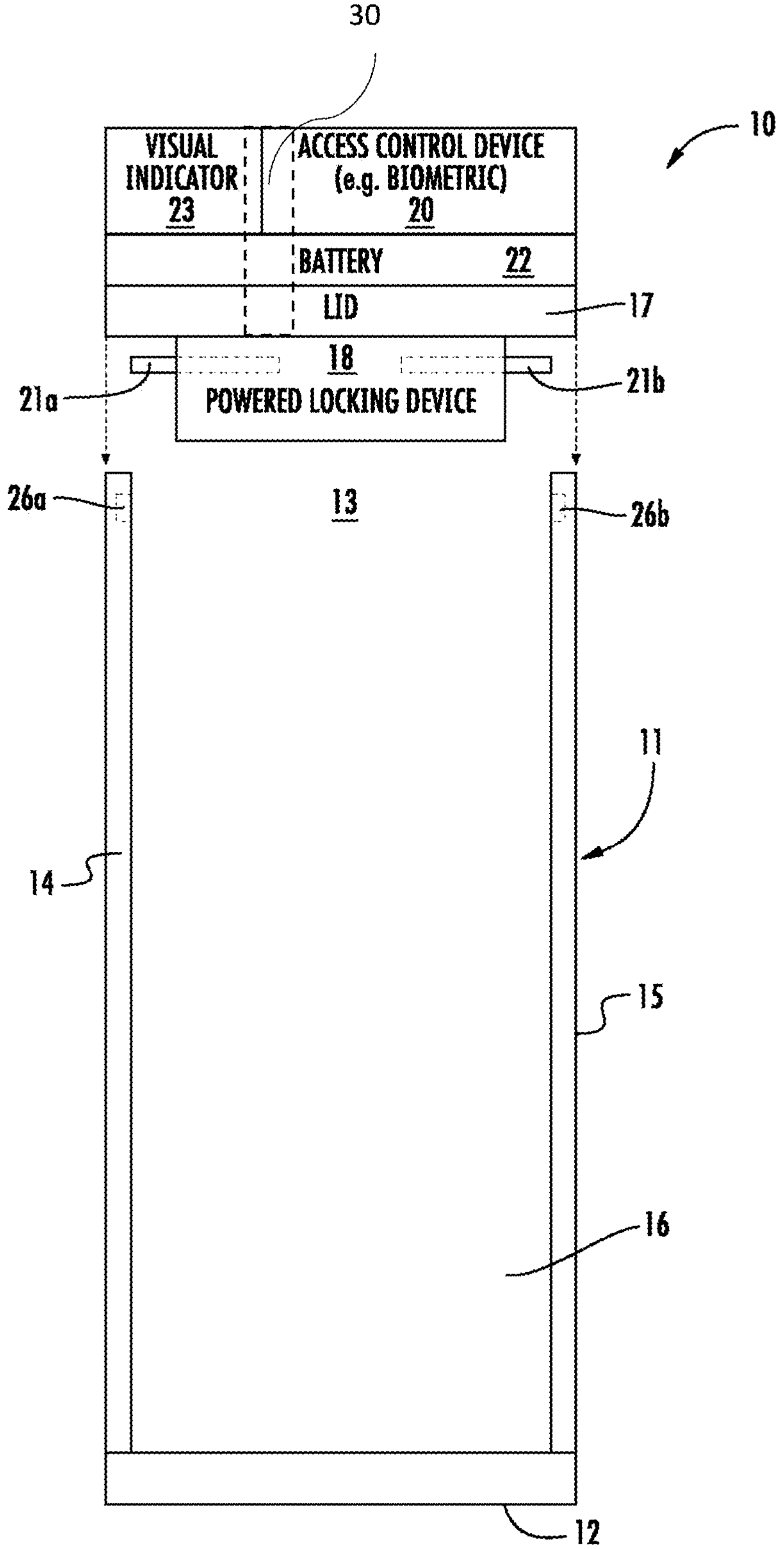
FIG. 1 is a schematic diagram of a first embodiment of the secure beverage container, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a secure beverage container 10 according to the present disclosure are now described. The secure beverage container 10 illustratively includes a body 11. The body 11 illustratively comprises a substantially cylinder-shape. Of course, this shape is merely exemplary, and the body 11 may have other shapes, such as a truncated-cone shape, a truncated-pyramid, or a polygonal frustum, for example.

The body 11 illustratively includes a first end 12, a second end 13 opposing the first end, a first longitudinal side 14 extending between the first end and the second end, and a second longitudinal side 15 opposing the first longitudinal side and extending between the first end and the second end. In the illustrated embodiment, the first longitudinal side 14 and the second longitudinal side 15 are substantially parallel (i.e. parallel±5°), but they may be canted in other embodiments. The first end 12 is closed, and the second end 13 is open.

The body 11 defines a cavity 16 therein to receive a beverage fluid. In some embodiments, the body 11 comprises insulating material to reduce thermal exchange between ambient air and the beverage fluid. The secure beverage container 10 illustratively includes a lid 17 to be received by the second end 13 to seal the cavity 16 in the body 11. The body 11 may comprise one or more of a polymer plastic material, a ceramic material, or a metallic material.

The secure beverage container 10 illustratively includes a powered locking device 18 configured to operate in one of a locked state (locked cycle) where the lid 17 is secured to the second end 13 of the body 11 (i.e. the lid cannot be removed forcibly), and an unlocked state (unlocked cycle) when the lid can be readily or easily removed from the second end of the body. In some embodiments, the powered locking device 18 may comprise a servomotor. In other embodiments, the powered locking device 18 may comprise a mechanical user driven locking mechanism, such as a key-turned lock. In this embodiment, the access control device 20 is configured to permit activation of the mechanical user driven locking mechanism based upon presence in the locked state and unlocked state. Helpfully, in the locked state, the beverage fluid in the cavity 16 cannot be accessed nor can it be adulterated unbeknownst to the user.

The secure beverage container 10 illustratively includes an access control device 20 coupled to the powered locking device 18 and configured to cause the powered locking device to switch between the locked state and the unlocked state based upon a security token. The access control device 20 comprises a controller (e.g. a processor, processing circuitry) configured to control a state of the powered locking device 18.

In the illustrated embodiment, the access control device 20 comprises a biometric scanner device, and the security token comprises a biometric characteristic of a user, for example, a fingerprint characteristic or a voice biometric characteristic. In some embodiments, the access control device 20 may comprise a voice command interface configured to permit switching between the locked and unlocked states using voice prompts (e.g. "lock" or "close", and "unlock" or "open"). In other embodiments, the access control device 20 comprises an alphanumeric keypad, and the security token comprises an alphanumeric key string. In yet other embodiments, the access control device 20 comprises a keyed or combination mechanical lock, and the security token comprises a physical key or a combination key.

In the illustrated embodiment, the powered locking device 18 is carried by the lid 17 and comprises a latch mechanism **21*a*-21*b* configured to selectively latch to adjacent portions of the body 11. In particular, the latch mechanism 21*a*-21*b* extends laterally outward into respective recesses 26*a*-26*b* in an interior wall of the body 11. Moreover, the secure beverage container 10 illustratively includes a battery power source 22 carried by the lid 17 and being coupled to the powered locking device 18 and the access control device 20. In short, in this embodiment, the smart logic and power devices are all carried by the lid 17. Some embodiments of the secure beverage container 10 include physical security features for the battery power source 22** to prevent circumvention attempts.

The secure beverage container 10 illustratively includes a visual indicator 23 (e.g. a light emitting diode (LED) indicator) coupled to the access control device 20 and configured to generate a visual indication (e.g. steady light, or rapid flashing) when the powered locking device 18 is in the unlocked state and/or when the powered locking device 18 is in the unlocked state for a time period greater than a set time period (e.g. 25 seconds). In embodiments where the secure beverage container 10 is coupled to a mobile wireless device of the user, the visual indication can be transmitted to the mobile wireless device as a mobile OS system notification. In some embodiments, the secure beverage container 10 includes a visual indicator 23 configured to generate a low battery indication.

In some embodiments, the visual indicator 23 can be omitted, or replaced with vibration indicators. Indeed, in some embodiments, the secure beverage container 10 illustratively includes a proximity detector (not shown) carried by the lid 17 and configured to detect when the lid is placed within the second end 13 of the body 11. In these embodiments, when the lid 17 is in position, the powered locking device 18 would automatically enter the locked state.

Figure 6:
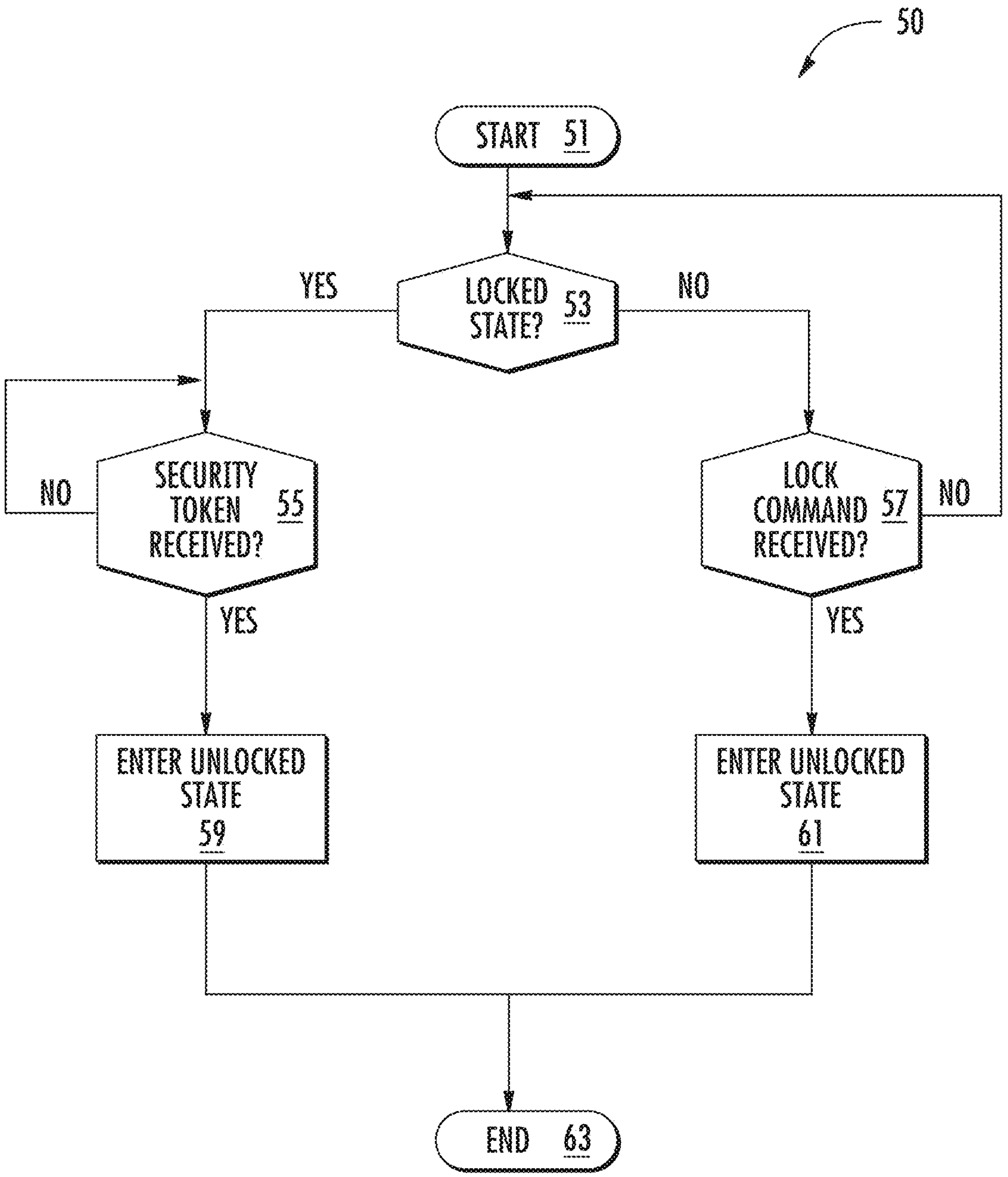
FIG. 6 is a flowchart for a method of operating the embodiments of the secure beverage container from FIGS. 1-5.

Referring now additionally to FIG. 6, a method for operating the secure beverage container 10, with reference to a flowchart 50, according to the present disclosure is now described. (Block 51). The powered locking device 18 only exits the locked state when the security token is received.

(Blocks 53, 55, 59, 63). Also, while in the unlocked stated, the powered locking device 18 is configured to enter the locked stated when the lock command is received. (Blocks 57, 61, 63).

In typical use, the user would need to place the powered locking device 18 in the unlocked state to add more beverage fluid or to drink the beverage fluid. In the illustrated embodiment, the lid 17 may comprise a sipping opening 30 permitting the beverage fluid to flow outward, and not inward. For example, the sipping opening may include a check valve coupled thereto, and the check valve may be controlled by the access control device 20. Advantageously, this permits easy access to the beverage fluid for consumption yet still blocks potential adulteration.

Another aspect is directed to a method for making a secure beverage container 10. The method includes forming a body 11. The body 11 includes a first end 12, a second end 13 opposing the first end, a first longitudinal side 14 extending between the first end and the second end, and a second longitudinal side 15 opposing the first longitudinal side and extending between the first end and the second end. The first end 12 is closed, and the second end 13 is open. The body 11 defines a cavity 16 therein to receive a beverage fluid. The method comprises forming a lid 17 to be received by the second end 13 to seal the cavity in the body, and coupling a powered locking device 18 configured to operate in one of a locked state where the lid is secured to the second end of the body, and an unlocked state when the lid can be removed from the second end of the body. The method also comprises coupling an access control device 20 to the powered locking device 18 and configured to cause the powered locking device to switch between the locked state and the unlocked state based upon a security token.

Figure 2:
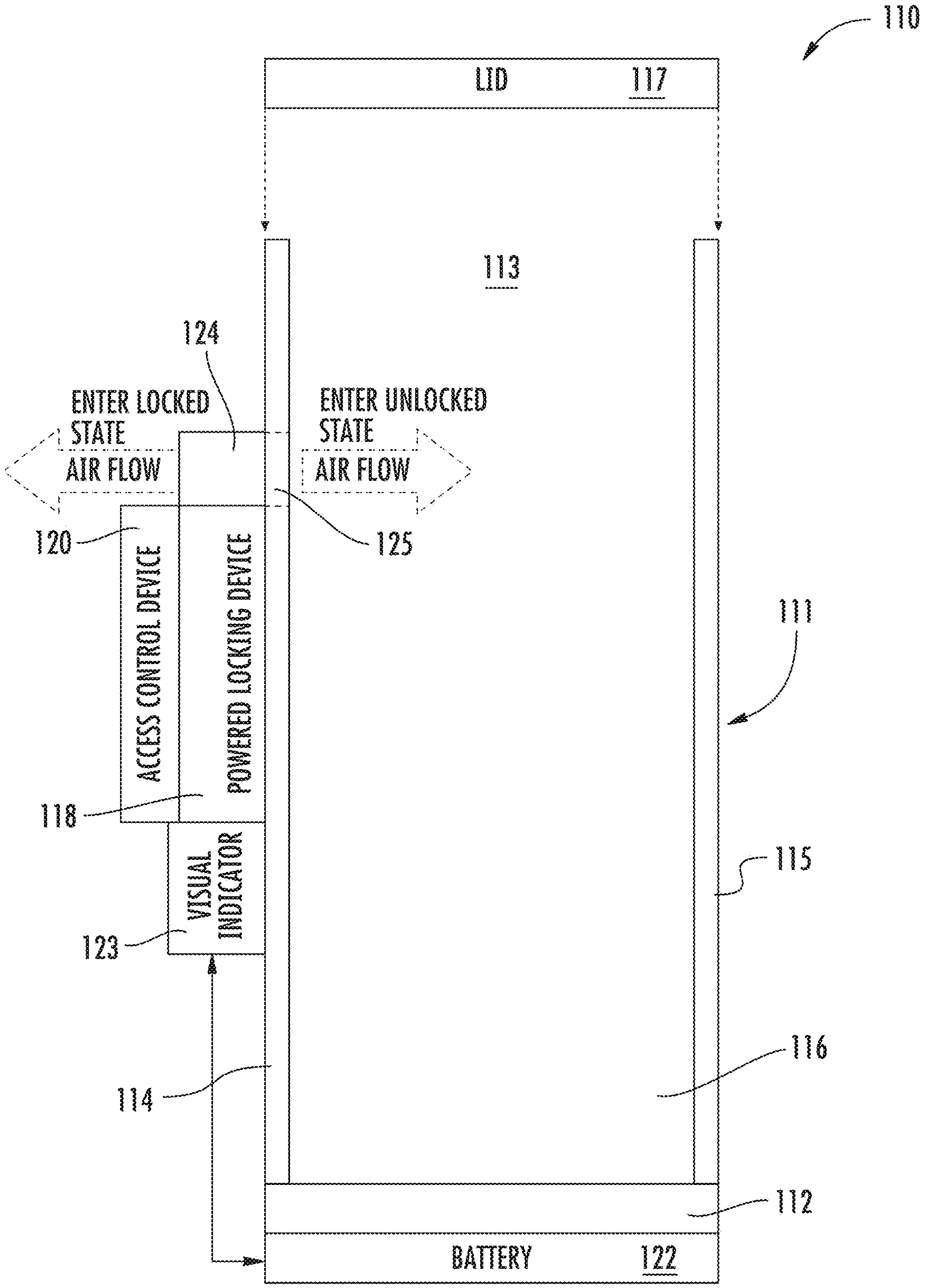
FIG. 2 is a schematic diagram of a second embodiment of the secure beverage container, according to the present disclosure.

Referring now additionally to FIG. 2, another embodiment of the secure beverage container 110 is now described. In this embodiment of the secure beverage container 110, those elements already discussed above with respect to FIGS. 1 and 6 are incremented by 100 and most require no further discussion herein. This embodiment differs from the previous embodiment in that this secure beverage container 110 illustratively includes the powered locking device 118 carried by the body 111. Also, in this embodiment, the access control device 120, the battery 122, the visual indicator 123 are all carried by the body 111 rather than the lid, as in the first embodiment.

In this embodiment, the access control device 120 comprises a pressure mechanism configured to lower pressure within the cavity 116 of the body 111 when in the locked state. In particular, the pressure mechanism illustratively includes an air pressure source 124 configured to exhaust air from the cavity 116 when in the locked state to create negative pressure in the cavity. The exhaust process would conclude when an internal cavity pressure hits a minimum threshold pressure differential great enough to lock the lid 117 to the body 111.

The pressure mechanism illustratively includes a valve device 125 (e.g. a 1-way valve, or check valve) configured to permit airflow into the negative pressure in the cavity 116 when switching from the locked state to the unlocked state. In other words, in the locked state, the access control device 120 creates an internal pressure within the cavity 116 that is lower than an ambient atmospheric pressure, thereby created a partial vacuum in the cavity 116 and making removal of the lid 117 very difficult. As will be appreciated, the pressure mechanism includes a second valve (not shown) and coupled between the air pressure source 124 and the cavity 116. This second valve is closed during typical operation and opens only when creating the negative pressure in the cavity 116. In some embodiments, the second valve and the valve device 125 may be integrated as a single valve device. In the illustrated embodiment, the battery 122 is carried at the first end 112 of the body 111, but in other embodiments, the battery can be carried on the first and second longitudinal sides 114, 115.

Figure 3:
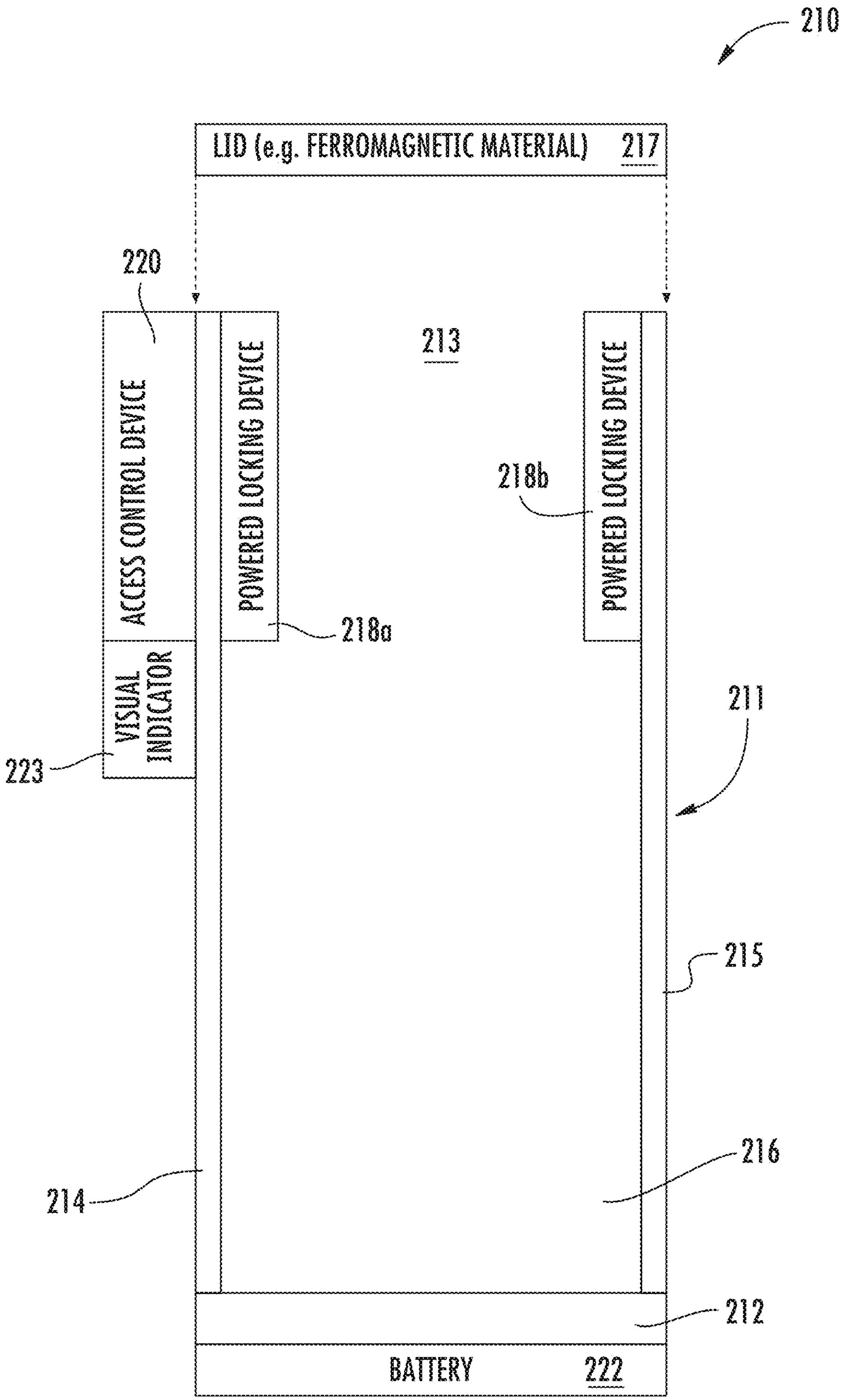
FIG. 3 is a schematic diagram of a third embodiment of the secure beverage container, according to the present disclosure.

Referring now additionally to FIG. 3, another embodiment of the secure beverage container 210 is now described. In this embodiment of the secure beverage container 210, those elements already discussed above with respect to FIGS. 1 and 6 are incremented by 200 and most require no further discussion herein. This embodiment differs from the previous embodiment in that this secure beverage container 210 illustratively includes the powered locking device being carried by the body 211 and comprising an electromagnet mechanism 218*a*, 218*b* configured to secure the lid 217 to the body. In the illustrated embodiment, the electromagnet mechanism 218*a*, 218*b* is carried by an interior wall of the body 211.

Also, the lid 217 comprises a ferromagnetic material, for example, iron, cobalt, or nickel. In some embodiments, the lid 217 may comprise a plastic or non-ferromagnetic housing carrying a ferromagnetic body therein. In other embodiments, the lid 217 may entirely comprise the ferromagnetic material. So, in the locked state, the electromagnet mechanism 218*a*, 218*b* is energized, thereby magnetically coupling the lid 217 to the second end 213 of the body 211. In the unlocked state, the electromagnet mechanism 218*a*, 218*b* is unpowered.

In one embodiment, the electromagnet mechanism 218*a*, 218*b* comprises a permanent electromagnet, i.e. an electromagnet having a permanent magnetic field, and when supplied with power, the magnetic field being turned off or more specifically neutralized. In this embodiment, in the unlocked state, the electromagnet mechanism 218*a*, 218*b* is energized to neutralize the permanent magnetic field.

Figure 4:
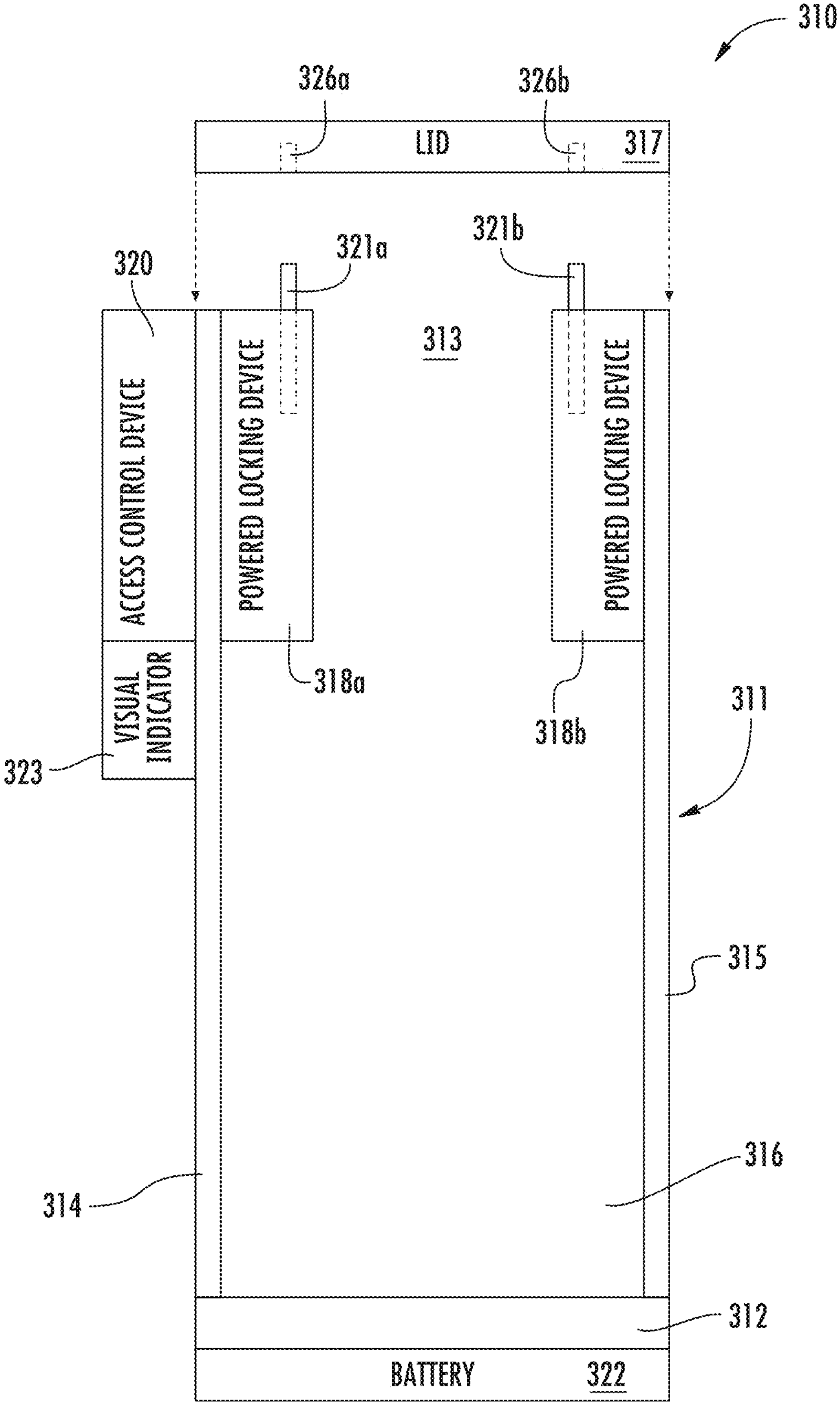
FIG. 4 is a schematic diagram of a fourth embodiment of the secure beverage container, according to the present disclosure.

Referring now additionally to FIG. 4, another embodiment of the secure beverage container 310 is now described. In this embodiment of the secure beverage container 310, those elements already discussed above with respect to FIGS. 1 and 6 are incremented by 300 and most require no further discussion herein. This embodiment differs from the previous embodiment in that this secure beverage container 310 illustratively includes a powered locking device 318*a*-318*b* carried by the body 311, in particular, an interior wall of the body.

The powered locking device 318 illustratively includes a latch mechanism 321*a*-321*b* configured to selectively latch to adjacent portions of the lid 317 via a vertical path of travel. In particular, the lid 317 would include respective recesses 326*a*-326*b* for receiving the latch mechanism 321*a*-321*b*. In the illustrated embodiment, the lid 317 comprises an annular threaded surface, and the body 311 defines an internal threaded surface for threadingly engaging the lid. Hence, when the latch mechanism 321*a*-321*b* extends the latches vertically, the twisting motion of the lid 317 is prevented, and the lid is secured to the body 311. In some embodiments (e.g. embodiments where the lid 317 is friction coupled to the body 311), the latch mechanism 321*a*-321*b* comprises curved latches for retaining the lid 317 securely in the locked state.

Figure 5:
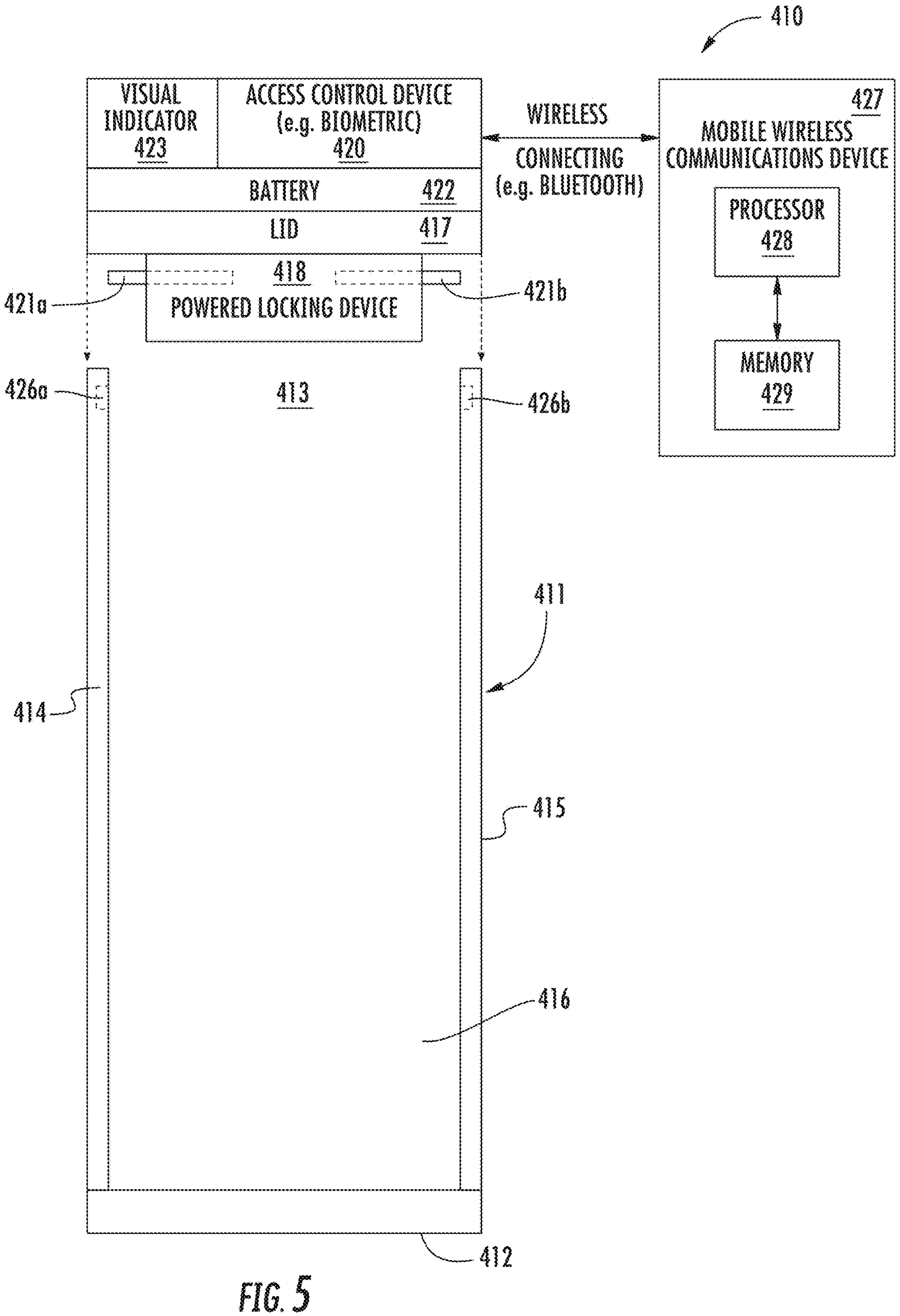
FIG. 5 is a schematic diagram of a fifth embodiment of the secure beverage container, according to the present disclosure.

Referring now additionally to FIG. 5, another embodiment of the secure beverage container 410 is now described. In this embodiment of the secure beverage container 410, those elements already discussed above with respect to FIGS. 1 and 6 are incremented by 400 and most require no further discussion herein. This embodiment differs from the previous embodiment in that this secure beverage container 410 illustratively includes a wireless access control device 420 comprising a wireless receiver/transceiver. For example, the wireless receiver/transceiver may comprise a near field communications (NFC) receiver/transceiver, or a Bluetooth receiver/transceiver.

The wireless receiver/transceiver is configured to receive a key from an associated mobile wireless communications device 427 of the user (e.g. a mobile cellular device, a smart watch, a tablet computing device, or a passive NFC identification tag, such as a key fob NFC tag, or an human body embedded NFC tag, as available from Biohax International of Stockholm, Sweden). The mobile wireless communications device 427 includes a processor 428 and memory 429 cooperating therewith to transmit the security token to the wireless access control device 420. In these wireless embodiments, the wireless receiver/transceiver can use a signal strength measurement as a proxy measurement for detecting a proximity of the user. Indeed, the access control device 420 may cause the powered locking device 418 to automatically enter the unlocked state when the user is detected within a threshold proximity, and automatically cause the powered locking device to enter the locked state when the user exceeds the threshold proximity, for example, when the user leaves the secure beverage container 410 unattended.

In yet other embodiments, the associated mobile wireless device of the user may control the state of the powered locking device 410. In particular, the powered locking device 418 locked/unlocked state may follow the lock state of the mobile operating system (OS) of the mobile wireless device. In other words, when the mobile wireless device is unlocked via, a biometric characteristic, for example, the powered locking device 418 is also unlocked, and when the mobile wireless device is locked, the powered locking device 418 is also locked.

As will be appreciated, in some embodiments, the powered components are carried by the lid (See FIGS. 1 & 5), and in other embodiments, the powered components are carried by the body (See FIGS. 2-4). It should be appreciated that these powered components can be carried alternatively by either the body or the lid, or even a selective combination therebetween. Also, it should be appreciated that the features of the embodiments can be applied equally to all of the other embodiments.

Indeed, in some embodiments that apply the air pressure approach of FIG. 2, the powered components can all be carried by the lid. Moreover, the lid may also comprise a sealing member extending about a periphery of a lower surface of the lid, which mates with the second end of the body.

The sealing member may comprise a rubber gasket or a neoprene seal, for example. The sealing member would create an air tight seal with anybody sharing a common size with the lid, permitting the lid to be mated with a wide variety of beverage containers. The bottom of the lid may consist of an injection molded rubber or neoprene shell and the entire bottom will be the sealing member of the lid. The specific durometer of the rubber or neoprene will allow the top portion of the body to recess into the rubber or neoprene.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A beverage container comprising:

a body comprising a first end, a second end opposing the first end, a first longitudinal side extending between the first end and the second end, and a second longitudinal side opposing the first longitudinal side and extending between the first end and the second end, the first end being closed, the second end being open, the body defining a cavity therein to receive a beverage fluid;

a lid to be received by the second end to seal the cavity in the body;

a locking device carried by the lid and comprising a latch mechanism configured to selectively latch to adjacent portions of the body;

the locking device configured to operate in one of a locked state where the lid is secured to the second end of the body, and an unlocked state when the lid can be removed from the second end of the body; and an access control device coupled to the locking device and configured to cause the locking device to switch between the locked state and the unlocked state based upon a security token.

2. The beverage container of claim 1 wherein the body defines a recess; and wherein the latch mechanism is configured to extend into the recess in the locked state, and retract from the recess in the unlocked state.

3. The beverage container of claim 2 wherein the body defines the recess on an interior surface of the body.

4. The beverage container of claim 1 wherein the access control device comprises a biometric scanner device carried by the lid; and wherein the security token comprises a biometric characteristic of a user.

5. The beverage container of claim 1 further comprising a battery power source carried by the lid and being coupled to the locking device and the access control device.

6. The beverage container of claim 5 further comprising a visual indicator carried by the lid, coupled to the access control device, and configured to generate a visual indication when the locking device is in the unlocked state.

7. The beverage container of claim 6 further comprising a motor coupled to the latch mechanism.

8. The beverage container of claim 6 wherein the visual indicator is configured to generate a visual indication for a low battery state.

9. The beverage container of claim 1 wherein the access control device comprises a wireless access control device configured to receive the security token wirelessly from a wireless communications device.

* * * * *